US009589707B2

(12) United States Patent
Senechal

(10) Patent No.: US 9,589,707 B2
(45) Date of Patent: *Mar. 7, 2017

(54) COMPOSITE BICYCLE FRAME WITH INTEGRAL ELECTRICAL INTERCONNECTIONS AND METHOD OF MANUFACTURING SAME

(71) Applicant: INDUSTRIES RAD INC., Saint-Georges-de-Beauce (CA)

(72) Inventor: Guillaume Senechal, St-Lambert de Lauzon (CA)

(73) Assignee: INDUSTRIES RAD INC., Saint-Georges De Beauce (CA)

( * ) Notice: Subject to any disclaimer, the term of this patent is extended or adjusted under 35 U.S.C. 154(b) by 0 days.

This patent is subject to a terminal disclaimer.

(21) Appl. No.: 14/677,401

(22) Filed: Apr. 2, 2015

(65) Prior Publication Data

US 2015/0318084 A1 Nov. 5, 2015

Related U.S. Application Data

(62) Division of application No. 13/721,503, filed on Dec. 20, 2012, now Pat. No. 9,022,407.

(51) Int. Cl.
| | | |
|---|---|---|
| *H01B 13/00* | (2006.01) | |
| *B62K 19/02* | (2006.01) | |
| *B62J 6/18* | (2006.01) | |
| *B62K 19/16* | (2006.01) | |

(52) U.S. Cl.
CPC ............ *H01B 13/0013* (2013.01); *B62J 6/18* (2013.01); *B62K 19/02* (2013.01); *B62K 19/16* (2013.01)

(58) Field of Classification Search
CPC ......... B62J 6/18; B62K 19/16; H01B 13/0013
USPC ....................................................... 280/281.1
See application file for complete search history.

(56) References Cited

U.S. PATENT DOCUMENTS

| | | | |
|---|---|---|---|
| 4,819,135 A | 4/1989 | Padilla et al. | |
| 5,008,782 A | 4/1991 | Murray | |
| 5,215,322 A | 6/1993 | Enders | |
| 5,523,620 A | 6/1996 | Eytcheson et al. | |
| 5,728,017 A * | 3/1998 | Bellio ...................... B62M 9/12 | |
| | | | 280/261 |
| 6,000,977 A | 12/1999 | Haake | |
| 6,035,084 A | 3/2000 | Haake et al. | |
| 6,162,140 A | 12/2000 | Fukuda | |
| 6,655,218 B1 | 12/2003 | Ogisu et al. | |

(Continued)

FOREIGN PATENT DOCUMENTS

| | | |
|---|---|---|
| EP | 1314637 | 5/2003 |
| WO | 0139253 | 5/2001 |
| WO | 2007041256 | 4/2007 |

*Primary Examiner* — Joseph Rocca
*Assistant Examiner* — Felicia L Brittman
(74) *Attorney, Agent, or Firm* — Norton Rose Fulbright Canada LLP

(57) ABSTRACT

A composite bicycle frame which comprises of a main frame including interconnected tubes and substantially composed of a composite material and having a composite layup structure. At least one electric wire electrically interconnects electrical components mounted to or in the frame. The at least one electric wire is embedded in the composite material structure forming the composite main frame. The electric wire has connectable conductive ends at each of the opposed ends thereof.

12 Claims, 4 Drawing Sheets

(56) References Cited

U.S. PATENT DOCUMENTS

| | | | | |
|---|---|---|---|---|
| 6,820,654 | B2 * | 11/2004 | Lindsay | A63B 53/10 |
| | | | | 138/153 |
| 7,147,238 | B2 * | 12/2006 | Oi | B62J 6/18 |
| | | | | 280/281.1 |
| 7,396,032 | B2 * | 7/2008 | Horiuchi | B62K 19/32 |
| | | | | 280/276 |
| 7,574,074 | B1 | 8/2009 | Huang | |
| 8,459,682 | B2 | 6/2013 | Calfee | |
| 2004/0166408 | A1 | 8/2004 | Anderson et al. | |
| 2005/0257956 | A1 | 11/2005 | Marchall et al. | |
| 2009/0247364 | A1 | 10/2009 | Sano et al. | |
| 2010/0170753 | A1 | 7/2010 | Castro | |
| 2012/0275179 | A1 | 11/2012 | Smith | |

* cited by examiner

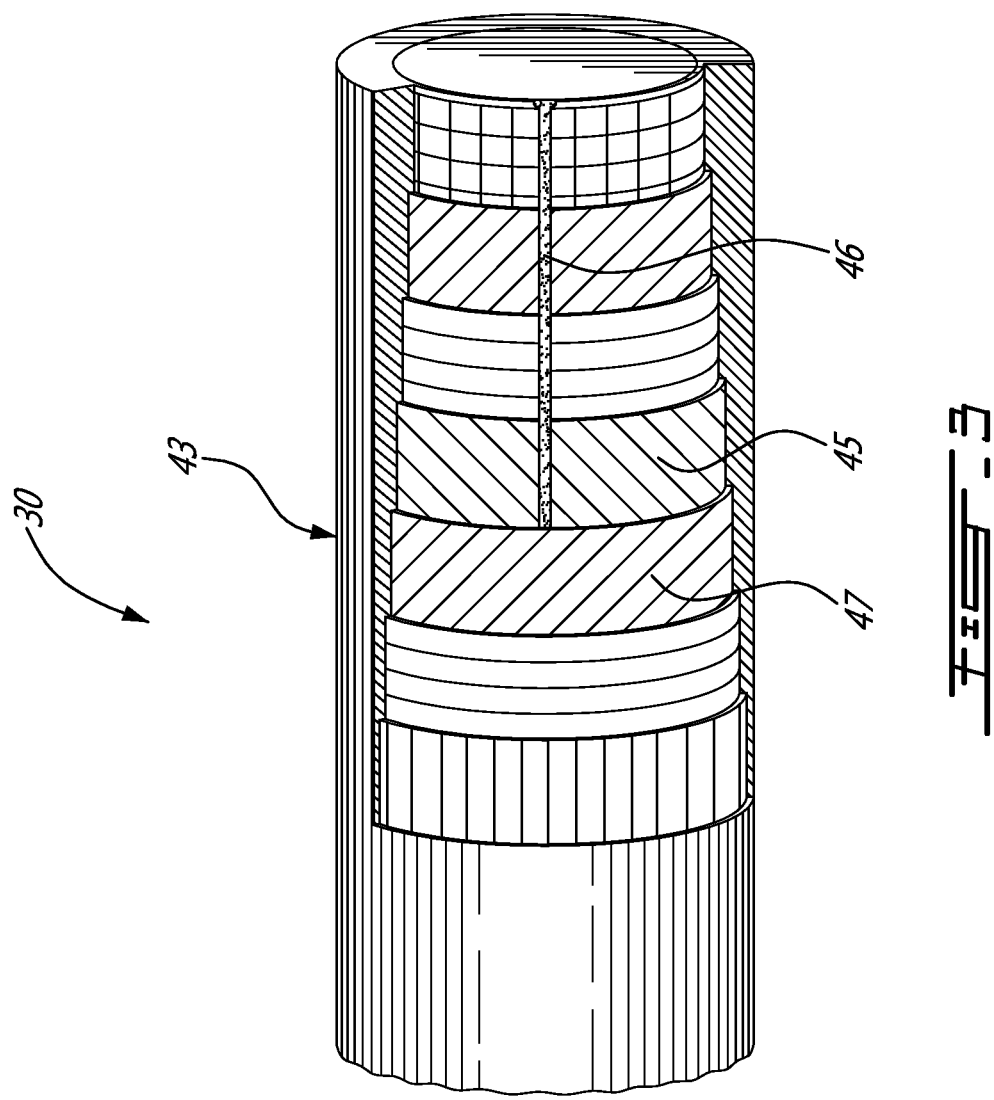

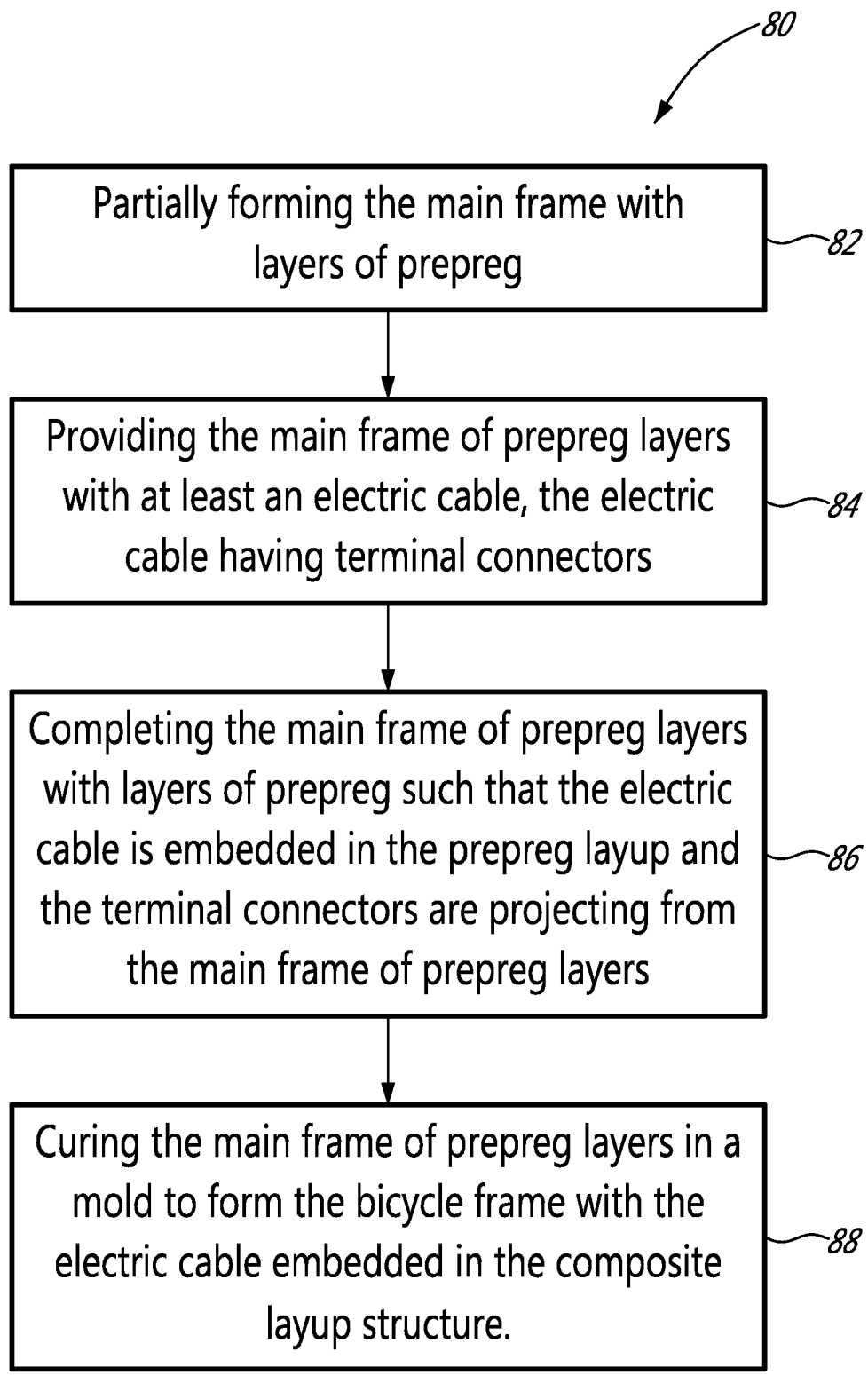

COMPOSITE BICYCLE FRAME WITH INTEGRAL ELECTRICAL INTERCONNECTIONS AND METHOD OF MANUFACTURING SAME

CROSS-REFERENCE TO RELATED APPLICATIONS

This application is a divisional of U.S. patent application Ser. No. 13/721,503 filed Dec. 20, 2012, the entire content of which is incorporated herein by reference.

TECHNICAL FIELD

The application relates generally to bicycles having composite frames and to methods of manufacturing such bicycles and composite bicycle frames.

BACKGROUND

In most known bicycle frames, regardless of their material, a majority of the length of each of the shifter cables runs along the outside of the bicycle frame tubing, although it is also known to pass these cables inside the bicycle frame tubing.

A bicycle frame 1 of the prior art, which may be formed of a metal or of a composite material for example, is shown in FIG. 1 and includes shifter and brake cables which at least partially run along the outside of the bicycle frame tubing. The bicycle frame 1 comprises a main frame 2. The main frame 2 includes a seat tube 3, a top tube 4, a down tube 5, a head tube 6, seat stays 7, chain stays 8 and a bottom bracket 9. The seat tube 3 is connected to a first end of the top tube 4. The head tube 6 is connected to a second end of the top tube 4. The bottom bracket 9 is connected to the bottom end of the seat tube 3. The down tube 5 is connected to the head tube 6 and the bottom bracket 9. The seat stays 7 are connected to the seat tube 3. The chain stays 8 are connected to the seat stays 7 and the bottom bracket 9. In the bicycle frame 1, the shifter cable 10 runs along the down tube 5 to the bottom bracket 9. The brake cables 11 run along the top tube 2.

The shifter and brake cables of the bicycle frame 1 may also at least partially run inside the hollow interior of the tubes forming the bicycle frame, and may for example be fed down through the hollow inside cavity defined within the down and/or top tubes 5 and 4 for example. While this generally improves the overall look of the bicycle, as any unsightly cables are substantially hidden from view because they are fed through the hollow tubes, these tubes must necessarily be hollow and further the assembly step required in feeding the cables through the frame is add time and cost to the overall bicycle assembly process. While bicycles have for years used mechanical gear shifting systems which require cables having moving inner cables within a stationary outer sheath which is fixed at both ends to the frame, recent developments have led to electronic gear-shifting systems becoming more widely available, including for example the Di2™ system made by Shimano™. In such electronic gear-shifting systems, riders are able to shift gears using electronic switches instead of convention gear control levers. Such switches are connected by an electric wire to a battery pack and to a small electric motor which drives the derailleur, used to displace the bicycle chain from one gear cog to the next. However, although such electronic gear-shifting systems have become more commonplace, the configuration and method used to feed the electric wires interconnecting the various components of the electronic gear-shifting system has remained substantially the same.

SUMMARY

It is therefore an object to provide an improved composite bicycle frame which is particularly adapted for use with electronic components, such as but not limited to, electronic gear-shifting systems and/or electronic braking systems.

In accordance with one aspect of the present invention, there is provided a composite bicycle frame comprising: a main frame including interconnected tubes, the main frame being substantially composed of a composite material and having a composite layup structure; and at least one electric wire adapted for electrically interconnecting electrical components mounted to or in the frame, the at least one electric wire being embedded in the composite material structure forming the composite main frame, the electric wire having opposed connectable conductive ends.

In accordance with another aspect of the present invention, there is provided a bicycle comprising: an electrical system mounted to the bicycle, the electrical system comprising at least a first electrical element and a second electrical element; and a frame including interconnected tubes, the frame being substantially composed of a composite material and having a composite layup structure, the frame having at least one signal-carrying cable embedded in the composite layup structure thereof such as to be integrally formed within the composite material of frame, the signal-carrying cable interconnecting the first and second electrical elements of the electrical system.

There is also provided, in accordance with a further aspect of the present invention, a method for manufacturing a composite bicycle frame having a composite layup structure, the composite bicycle frame comprising a main frame including interconnected tubes, the method comprising the steps of: partially forming the main frame with layers of composite fibre and/or molding compound; providing the partially formed main frame with at least an electric wire laid within the layers of the composite fibre and/or molding compound, the electric wire having connectable conductive ends; completing the main frame with the electric wire embedded within the composite layup structure of the composite bicycle frame and the connectable conductive ends are exposed; and curing the main frame of composite fibre layers and/or molding compound in a mold to form the composite bicycle frame with the electric wire embedded within the composite layup structure.

Further details of these and other aspects of the present invention will be apparent from the detailed description and figures included below.

BRIEF DESCRIPTION OF THE DRAWINGS

Reference is now made to the accompanying figures, in which:

FIG. 3 is a partial section view of the bicycle frame tubing of FIG. 2, with the electric cable embedded between layers of composite material; and FIG. 4 is a block diagram of a method for manufacturing the bicycle frame of FIG. 2 in accordance with the present disclosure.

DETAILED DESCRIPTION

Figure 1:
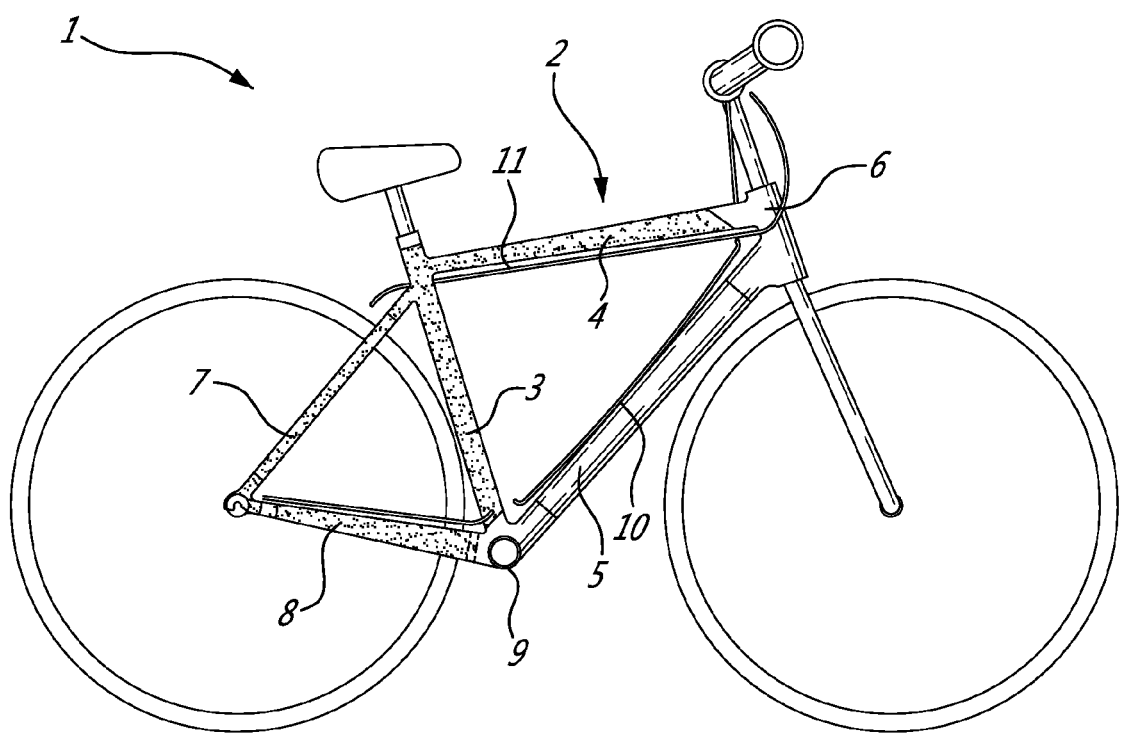
FIG. 1 is a perspective view of a bicycle frame having shifter and brake cables running along the bicycle frame tubing in accordance with the prior art.
Figure 2:
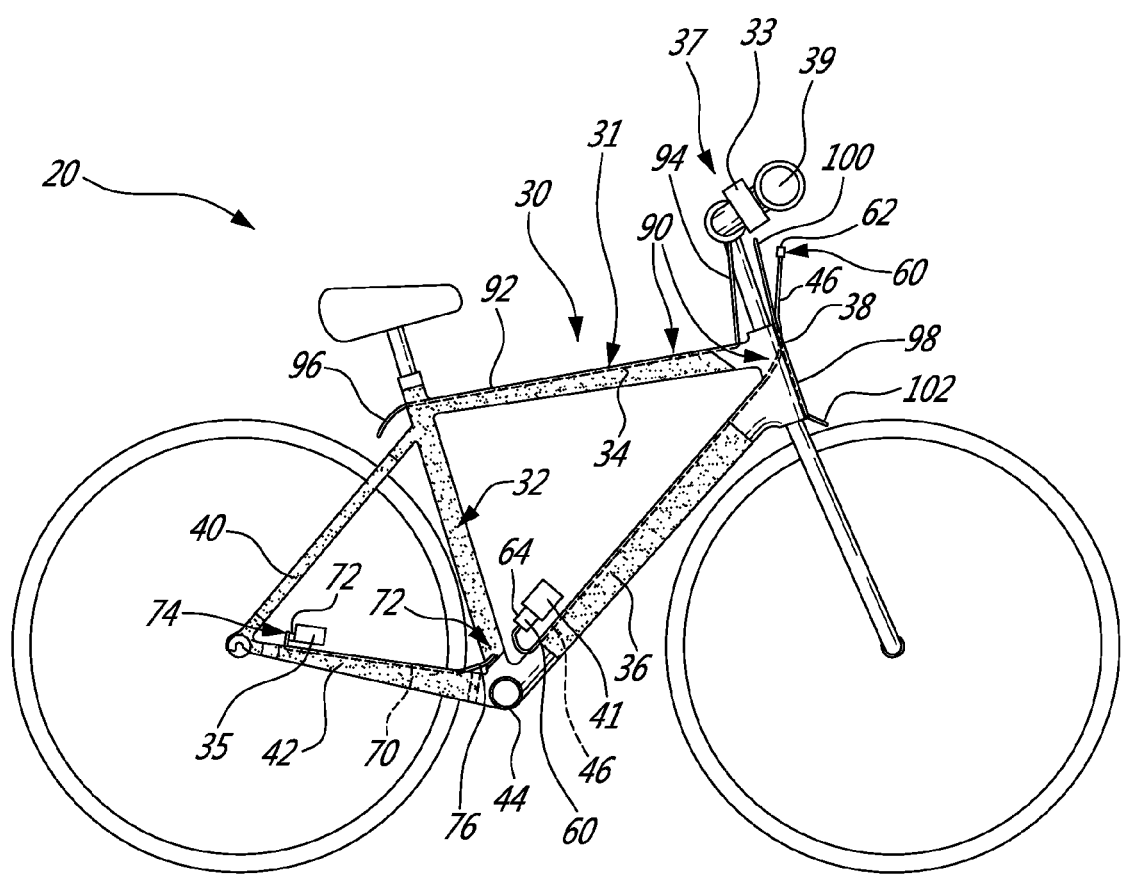
FIG. 2 is a perspective view of a bicycle frame in accordance with the present disclosure having at least one electric cable embedded in the composite layup structure of the bicycle frame tubing.

Referring now to the drawings and more particularly to FIG. 2, the bicycle 20 of the present disclosure includes a bicycle frame 30 at least a majority of which is composed of a composite material, and therefore which has a composite structure. The term "composite structure" or "composite layup structure" as used herein is understood to refer to any suitable composite (i.e. non-metallic) material which may be used for the purposes of a bicycle frame. The composite material as defined herein includes fibres within a resin matrix. However, in at least one possible embodiment, the composite material may be constructed using an assembly of fibre prepreg cloths of varying modulus and tow, which are assembled and bonded within a resin matrix to form a composite layup structure after a high temperature curing and/or molding step. The composite frame 30 may therefore be composite material such as carbon fibre. In one embodiment the frame 30 of the bicycle 20 is entirely composed of the composite material, however the frame 30 may alternately comprise only a portion of which is made of a composite material.

Although the bicycle 20 will generally be described herein with particular reference to the frame 30 thereof, it is to be understood that the bicycle 20 includes all other components which are typically included on a bicycle, such as the front an rear wheels, a saddle and seat post mounted to the seat tube, a front fork mounted to the head tube, as well as handle bars, etc connected with the front fork. Although gears, the chain, pedal cranks, etc. are not depicted in FIG. 2 for simplicity, it is to be understood that such components also form part of the bicycle 20 as described herein. Additionally, the presently described bicycle 20 may be a road bicycle, a mountain bicycle, or any other hybrid type variety thereof (ex: "cross" or city bike, etc.). Although the bicycle 20 as shown in FIG. 2 is depicted as a rigid or "hard tail" bicycle (i.e. it does not have any rear suspension system) such as which may be used on the road, it is to be understood that the frame 30 of the present bicycle 20 may also be employed on a mountain bicycle having a rear suspension system and thus which may not have a traditional rear triangle configuration nor a rigid rear structure.

Regardless of the type of bicycle, therefore, the bicycle frame 30 includes generally a main frame 31 having at least a seat tube 32, a top tube 34, a down tube 36, a head tube 38, and a bottom bracket 44. The frame 30 may also include seat stays 40 and chain stays 42, however as noted above depending on the configuration of the particular bicycle these may from part of a separate part of the bicycle frame, such as for example a rear swing arm assembly. In the embodiment depicted in FIG. 2, the seat tube 32 is connected to a first end of a top tube 34, and the head tube 38 is connected to a second opposed end of the top tube 34. The bottom bracket 44 is connected to the bottom end of the seat tube 32. The down tube 36 is connected to the head tube 38 and the bottom bracket 44. In the bicycle depicted in FIG. 2, which is a "hard tail" bicycle (i.e. it does not have any rear suspension system), the seat stays 40 are connected to the seat tube 32, and the chain stays 42 are connected to the seat stays 40 and the bottom bracket 44.

The bicycle 20 is equipped with one or more electronic derailleurs, such as the front derailleur 41 shown graphically in FIG. 2 and located near the bottom end of the seat tube 32 adjacent the bottom bracket 44. Accordingly, the bicycle is equipped with corresponding electronic shifters (not shown) which may be located on the handlebar 39 mounted to the stem which extends through the head tube 38 of the frame.

The frame 30 of the bicycle 20 comprises at least one (i.e. one or more than one) electric wire 46 embedded within the composite material which forms at least a portion of the frame 30. In one embodiment, at least one electric wire 46 is embedded in the composite layup structure of one or more of the tubes forming the main frame 31, such as the down tube 36 for example. Accordingly, as will be seen in more detail below, at least a majority of the overall length of the electric wire 46 is therefore integrally formed within the composite material of one or more tubes of the frame 30 during the manufacturing process of the composite material itself, such as to be permanently embedded within the composite material. The electric wire 46 includes terminal connectors 60 at each of its opposed ends, and in at least one embodiment these terminal connects 60 are also integrally formed and embedded within the composite material forming the frame 30. For example, a first one 62 of the terminal connectors 60 may extends from the head tube 38 for connecting with the shifters, and a second one 64 of the terminal connectors 60 extends from the seat tube 32 or the down tube 36 adjacent the bottom bracket 44 for connecting with the front derailleur. As in this embodiment the terminal connectors 60 are also integrally formed with, and thus embedded within, the composite material of the frame 30, in order to connect the electronic components of the electronic gear-shifting system mounted to the bicycle 20 one needs only to plug the electronic shifters and the electronic derailleurs into their associated terminal connectors 60 formed directly into the frame 30.

In at least another embodiment, however, the terminal connectors 60 are exterior to the composite material forming the frame 30, i.e. not integrally formed and not embedded within the composite material forming the frame 30. Accordingly, the remote end of the electric wire 46 having the first one 62 of the terminal connectors 60 thereon may extend from the head tube 38, and the opposed remote end of the electric wire 46 having the second one 64 of the terminal connectors 60 may extend from the seat tube 32 or the down tube 36 adjacent the bottom bracket 44. The first one 62 and the second one 64 of the terminal connectors 60 perform the same function as described above, but are simply not themselves integrally formed within the composite material of the frame 30.

It is also contemplated that the embedded conductors may have an insulating sheath at their ends which extend out of the tubes wherein the wire inside the shielded cover may be exposed by stripping an end of its insulating sheath for connection with the different modules.

The term "embedded" when used herein is understood to refer to the electric wire being substantially entirely enclosed within, or made an integral part of, the composite material structure of the bicycle frame 30, as shown in more detail in FIG. 3. As such, at least a majority of the electric wire is embedded and electrically shielded in the composite material itself, rather than being simply bonded or otherwise fastened to an outer surface thereof. It is to be understood, however, that the very remote ends of the wire may however extend beyond the composite frame, and thus may protrude therefrom at each end of the wire. The wire so embedded is still considered to be substantially entirely embedded within the composite material of the frame in as defined herein.

Referring now to FIG. 3, a portion of a tube 43 of the composite frame 30 is depicted with several composite layers having been striped away such as to shown the electric wire 46 embedded between layers of composite fibre, in accordance with the composite frame 30 of the present bicycle 20. In this embodiment, the electric cable 46 is thus embedded between layers of "pre-preg" of the composite material forming the frame 30, and may for example be disposed within the composite layup structure between the fourth layer 45 and the fifth layer 47 as shown in FIG. 4, however of course any combination may be possible provided the electric wire 46 is in fact embedded within the composite material itself during the manufacturing process of the composite material prior to the final molding or curing process. The wire 46 may be shielded or have an electrically insulating sheath. Additionally, as noted above the composite material forming the bicycle frame 30 may not in fact include pre-preg layers, however the electric cable(s) 46 are nevertheless embedded within the composite fibre and resin matrix material which forms the composite material, and in fact the electric cable(s) 46 are introduced therein during the production of the composite frame prior to the final molding process step. It is also pointed out that the cable could also be embedded in other suitable moulding compound in a compression molding process.

The embedding of one or more electric wires 46 in the composite layup structure of the composite frame 30 means that the electric wires or cables which may be used for the electronic shifting systems and/or electronic braking systems are integrally formed within the composite frame 30 itself during the manufacturing process.

Referring back to FIG. 2, in one embodiment the electronic shifting system 37 of the present bicycle 20 may include a front derailleur 41 and a rear derailleur 35 which are controlled by, and electrically interconnected with, electronic shifters 33 mounted to the handlebars 39 via the one or more electric cables 46 which are embedded within the composite material of the frame 30. The electric cables 46 may therefore each extend between one or more electronic shifters 33 to one or more derailleurs 41, 35. In the depicted embodiment, the front derailleur 41 is located near the bottom end of the seat tube 32 adjacent the bottom bracket 44, and the rear derailleur is located near the rear end of the chain stays 42 adjacent the connection with the seat stays 40.

In one particular embodiment, the frame 30 may also comprise additional electric wires or cables 70 embedded in the composite layup structure of the composite frame 30. For example, an electric cable 70 may be used to interconnect the front and rear derailleurs 41, 35, wherein only a single electric cable 46 may run within the frame 30 from the electronic shifters 33 to the front derailleur 41, and then the additional electric cable 70 may run within the frame 30 from the front derailleur 41 to the rear derailleur 35. As per the electric wire 46 described above, the electric wire 70 includes terminal connectors 72 on opposed ends thereof, which are also integrally formed, and thus embedded, within the composite material of the frame 30. A first one 74 of the terminal connectors 72 extends from the end of the chain stray 42 for connecting with the rear derailleur 35, and a second one 76 of the terminal connectors 72 extends from the chain stays 42 adjacent the bottom bracket 44 for connecting with the front derailleur 41.

As also illustrated in FIG. 2, in at least one possible embodiment the composite frame 30 may also comprise electric brake cables/wires 90 that are similarly embedded within the composite layup structure of the frame 30, for use in conjunction with an electronic braking system for the bicycle 20. For example, a first brake cable 92 which includes a first 94 and second 96 end may be integrally formed within the top tube 34, for example, and may include first 94 end of the first brake cable 92 disposed near the head tube 38 for connecting with a rear wheel brake actuator, and a second end 96 of the brake cable 92 disposed near the seat stays 40 and/or the seat tube 32 for connecting with an electronic rear wheel brake calliper. A second brake cable 98 may also be integrally formed within the composite frame 30 and may include first 100 and second 102 ends. The first end 100 of the second brake cable 98 is located for example near the head tube 38 for connecting with a front wheel brake actuator, and the second end 102 of the second brake cable 98 may be located near the head tube 38 for connecting with the front wheel brake calliper.

Although the electric cables/wires have been described for use in conjunction with an electronic shifting system (comprising electronic derailleur(s) and shifter(s) for example) and/or with an electronic braking system (comprising electronically actuated brakes for example), the electric cables/wires 46, 70 described herein as being embedded within the composite layup structure of the composite frame 30 may also be used for other signal and/or current carrying purposes. As such, the electric wires/cables described herein may be used to electrically interconnect components of an electrical system mounted to the bicycle, wherein the electrical system may comprise for example a first actuating element (such as the electronic shift lever) and a second actuated element (such as the electronic derailleur(s)). Additionally, the electric wires 46, 70 embedded within the composite material of the frame 30 as described herein may also be used to feed power to or receive signals from other components on the bicycle 20, such as but not limited to, electronic speed and/or distance indicators/calculators mounted to the handle-bar, electrically controlled shocks, lights, digital screen and/or interfaces, etc. Additionally, in at least another embodiment, the embedded electric wires 46, 70 may be connected to sensors also embedded within the composite frame 30, and therefore may be used for transmitting monitoring information about the composite material itself, such as for example to determine and warn of the presence of cracks, or to measure pressure and/or temperature of the material or of the surrounding environment. In a further embodiment, the electric cables/wires embedded within the composite layup structure of the frame 30 may also be used in for the purposes of electronic and/or electrical applications, such as for example a LCD screen. Such a LCD screen may, for example, be integrated directly into the composite frame 30. The LCD screen may also be a flexible screen that is itself directly integrated into the composite material of the frame. However, it is to be understood that most standard LCD screens could only be introduced into the composite frame after the frame has been molded due to the high temperatures involved. However, if the LCD screen is capable of withstanding the high temperatures required during the composite material molding and curing process, that it could also be integrated directly into the composite material before the molding step during the production thereof.

In all cases, however, the electric wires/cables 46, 70 described herein may be used for the transmission of a power signal and/or of a data signal, and therefore may be used either to provide current to an electrical device (either mounted on or embedded into the frame) or to transmit and/or receive data to and/or from the electrical device to which it is in electrical communication.

In at least one further possible embodiment, the wires/cables 46, 70 embedded within the composite frame 30 may also comprise optical fibre cables/wires that may be used for the same purposes as described above, albeit that they transmit a data signal via light transmitted through the fibre optic cable.

Referring now to FIG. 4, a block diagram of a method 80 for manufacturing the composite bicycle frame 20 of FIG. 2 in accordance with the present disclosure is illustrated. In the method 80, a bicycle frame 30 having a composite layup structure is manufactured. The composite bicycle frame 30 of the bicycle 20 is as described above.

In step 82 of the manufacturing method 80, at least the main frame 31 of the composite frame 30 is partially formed with layers of prepreg in accordance with methods known in the art of forming composite layup structure. The term "prepreg" is understood to refer to fibres in a resin matrix. These usually take the form of a weave or are uni-directional or a chopped fibre mat. They already contain an amount of a resin or matrix material used to bond them together and to other components during manufacture. The term "matrix material" when used herein is understood to refer for example to resins which are commonly used in the manufacture of composite bicycle frames. The term "composite fibres" when used herein is understood to refer, for example, to non-metallic fibres which are embedded within a resin, and which is a non-metallic material used for bicycle frames. Such composite materials, such as but not limited to those made with carbon fibres for example, are light-weight, corrosion-resistant and strong, and can be formed into almost any shape desired. Other materials besides carbon fibre, such as metallic boron, can be added to the matrix to enhance stiffness further. Kevlar fibres may also be introduced into the carbon weaves to improve vibration damping and impact strength. Other molding compounds may be used in a compression molding process of the frame and may not contain prepeg composite fibres.

In step 84, the frame 30 of prepreg layers is provided with at least one electric wire 46, the electric wire 46 having terminal connectors 60 disposed at each of the opposed ends of the wire. The electric wire 46 may include an insulated outer sheath which is compatible with the manufacturing condition of the bicycle frame 20, i.e. the prepreg layers and the curing conditions.

In step 86, the frame 30 of prepreg layers is completed to the desired size with layers of prepreg such that the electric wire 46 is substantially fully embedded in the prepreg layup and the terminal connectors 60 are also integrally formed within the layers of prepreg. The electric terminals of the connectors 60 remain exposed, but the terminal connections 60 of each of the electric wires 46 remain embedded and insulated within the composite material of the frame 30.

In step 88, the main frame 30 of prepreg layers is placed into a mold and is cured, in accordance with the methods known in the art of forming composite layup structure, to form the composite frame 30 of the bicycle 20 having one or more electric wires 46 embedded within the composite layup structure of the frame.

The above description is meant to be exemplary only, and one skilled in the art will recognize that changes may be made to the embodiments described without departing from the scope of the invention disclosed. The term "embedded" as used herein, with reference to the electric cables/wires which are disposed directly within the composite material, is understood to mean that the said wires are encapsulated and electrically insulated by the composite material itself during the manufacturing process of the composite material, for example prior to the final molding or curing process thereof. The electrical cables/wires may also be shielded or have an outer electrically insulated sheath. As such, regardless of the number of layers of fibre prepreg which are disposed overtop of the integrated electrical wires, if any at all, the wires are said to be imbedded in that they are integrally and monolithically formed within the material during its production, and are not merely adhered to an outer or inner surface of an already formed material. However, this does not exclude that the presently described embedded wires cannot be integrally formed with the composite material on the very outer or inner surface of the composite tubes of the present bicycle. The bicycle frame 30 has been generally described herein as being composite, which may mean that in at least one embodiment it is composed of a carbon fibre formed within a resin for example. However, other composite materials may of course also be used to form the presently described bicycle frame 30. The electric wires 46, 70 described herein are understood to be current or electric signal carrying wires/cables which interconnect electronic and/or electrical components such as to conduct an electric signal or power from one component to another (i.e. such as to connect these components in electrical communication). These wires/cables 46, 70 are understood to be different and distinct from traditional cables which physically slide within surrounding sheaths in order to physically connect traditional shift levers and derailleurs, or traditional brake levers and brake callipers. Still other modifications which fall within the scope of the present invention will be apparent to those skilled in the art, in light of a review of this disclosure, and such modifications are intended to fall within the appended claims.

What is claimed is:

1. A method for manufacturing a composite bicycle frame having a composite layup structure, the composite bicycle frame comprising a main frame including interconnected tubes and a bottom bracket secured to some of said tubes, the method comprising the steps of:
   partially forming the main frame with layers of composite fibre and/or molding compound;
   providing the partially formed main frame with at least one electric wire laid within the layers of the composite fibre or said molding compound, the at least one electric wire having connectable conductive ends;
   completing the main frame with the at least one electric wire embedded within the composite layup structure of the composite bicycle frame and the connectable conductive ends exposed; and
   curing the main frame of composite fibre layers and/or molding compound in a mold to form the composite bicycle frame with the at least one electric wire embedded within the composite layup structure.

2. The method as defined in claim 1, wherein said composite fibre layers are electrically insulating fibre layers, and further comprising the step of securing said connectable conductive ends to terminal connectors.

3. The method as defined in claim 1, wherein the at least one electric wire includes a brake wire or a shifting wire for transmitting electrical signals to an electronic braking or electronic shifting system.

4. The method as defined in claim 1, further comprising securing terminal connectors to said connectible conductive ends of the at least one electric wire.

5. The method as defined in claim 4, further comprising integrally forming the terminal connectors within the composite layup structure of the main frame.

6. The method as defined in claim 5, further comprising applying said additional layers of the composite fibre and/or molding compound over at least a portion of the terminal connectors.

7. The method as defined in claim 1, further comprising first one of the connectable conductive ends of the at least one electric wire is disposed proximate a head tube of the main frame adapted for connecting with electronic shifters of an electronic shifting system of the bicycle, and a second one of the connectable conductive ends of the at least one electric wire is disposed proximate a seat tube or a down tube of the main frame adapted for connecting with one or more derailleurs of the electronic shifting system of the bicycle.

8. The method as defined in claim 7, further comprising securing terminal connectors to the first one and the second one of said connectible conductive ends, and integrating the terminal connectors into the composite layup structure of the composite bicycle frame.

9. The method as defined in claim 8, further comprising electrically insulating an external end portion of the at least one electric wire secured to the terminal connectors.

10. The method as defined in claim 1, further comprising forming the composite layup structure out of carbon fibre.

11. The method as defined in claim 1, further comprising selecting the at least one electric wire to be a signal-carrying cable configured to carry a power signal and/or a data signal therethrough.

12. The method as defined in claim 11, further comprising selecting the signal-carrying cable to be an optical fibre cable.

* * * * *